Patented Oct. 3, 1950

2,524,185

UNITED STATES PATENT OFFICE 2,524,185

THYMYL N-ISOAMYLCARBAMATE

Otto Zima, Darmstadt-Eberstadt, and Fritz V. Werder, Darmstadt, Germany, assignors to E. Merck, Darmstadt, Darmstadt, Germany, a copartnership No Drawing. Application September 21, 1949, Serial No. 117,081. In Germany October 1, 1948

1 Claim. (Cl. 260—479)

Numerous compounds have been proposed for combating human oxyuriasis, which are accompanied either by the disadvantage of relatively great toxicity for the patient or doubtful efficaciousness against the parasite. These disadvantages are avoided by the use of the heretofore unknown thymyl N-isoamylcarbamate prepared according to the invention. This ester possesses marked vermifuge activity against Oxyuris with excellent tolerance, which makes its use safe in pediatrics. The mouse tolerates 6 gm./kg. without reaction, higher doses cannot quantitatively be administered. It is similar in the rat, the guinea pig, and the cat, which tolerate 3 gm./kg. without reaction. In adult human beings 3 x 2 gm. daily were administered without trouble. In severe infestations with Oxyuris an especially annoying itching becomes noticeable, and it is a particular merit of thymyl N-isoamylcarbamate that, when administered in the therapeutic amount, it brings about the disappearance of the unpleasant itching in a striking manner.

The present invention is as follows: An isoamyl derivative of the formula $(CH_3)_2CHCH_2CH_2-X$ is reacted with a derivative of thymol of the formula $Y-OC_{10}H_{13}$, in which X and Y are so selected that upon reaction the acid amide group —NH—CO— (with the nitrogen linked to the isoamyl residue) is formed. Thus, X and Y are such reactive groups that the reaction under discussion is one that is well known for the preparation of other N-substituted carbamic acid esters. Specifically, for example, one can obtain the desired product by reacting isoamylamine with an easily cleavable ester of thymol. One uses preferably in this case the thymyl chloroformate or the carbonic acid ester of thymol. Upon the reaction of isoamylamine with thymyl chloroformate one can operate in an inert organic solvent or in aqueous medium in the presence of a base. In the latter case one proceeds advantageously with water-soluble salts of isoamylamine, for example, the hydrochloride. Moreover, according to what has been said, for example, the following reactions are practicable:

Reaction of isoamyl isocyanate with thymol.

Reaction of isobutylacetamide first of all with halogen and then with sodium thymoxide or thymol.

Reaction of isocapric acid azide with thymol.

Reaction of isoamylhalide with thymyl carbamate.

Thymyl N-isoamylcarbamate of the formula:

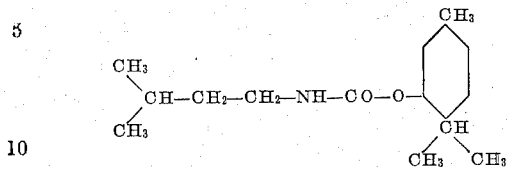

is a colorless, crystalline material with a melting point of 57° C., which is practically insoluble in water (solubility in water at room temperature is less than 1:50,000). If the preparation is treated with normal methyl alcoholic alkali at 40°, about 86% is saponified after thirty days.

Example I

To a solution of 780 gm. of isoamylamine in 4 liters of absolute ether, stirred and cooled with ice water, a solution of 904 gm. of thymyl chloroformate is slowly added. This is heated at reflux for one hour and, after cooling, is freed of the precipitated isoamylamine hydrochloride by filtration. The filtrate is concentrated and the residue, which immediately crystallizes, is recrystallized from one part by volume of low boiling petroleum ether. Yield: 850 gm. colorless needles with a melting point of 57°.

Example II 2.12 kg. thymyl chloroformate are suspended in a solution of 1.24 kg. isoamylamine hydrochloride in 2.48 liters of warm water. Under vigorous stirring in the course of a quarter hour a solution of 880 gm. of sodium hydroxide in 2.64 liters of water is added, while the reaction vessel is cooled with running water. From an initial temperature of 35° the temperature of the reaction mixture increases to about 65°. After the reaction is completed, it is cooled with vigorous stirring at 15°, the reaction product, having become solid, is removed, pulverized, washed well with water, and dried in the air. The crude product is recrystallized from one part by volume of low boiling petroleum ether.

Yield: 2.1 kg. M. P. 57°.

We claim:
Thymyl N-isoamylcarbamate of the formula

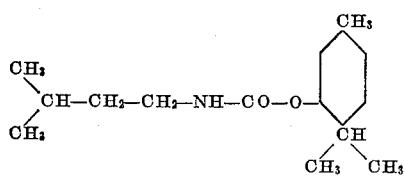

a colorless, crystalline material, which melts at about 57° C., is practically insoluble in water, and, upon alkaline saponification, produces isoamylamine and thymol (along with carbonic acid).

OTTO ZIMA.
FRITZ V. WERDER.

REFERENCES CITED

The following references are of record in the file of this patent:

UNITED STATES PATENTS

| Number | Name | Date |
|---|---|---|
| 1,252,452 | Kropp | Jan. 8, 1918 |
| 2,493,710 | Aschlimann | Jan. 3, 1950 |

FOREIGN PATENTS

| Number | Country | Date |
|---|---|---|
| 296,889 | Germany | Mar. 7, 1917 |
| 359,865 | Great Britain | Oct. 29, 1931 |